United States Patent
Hoffman

(12) 
(10) Patent No.: US 6,241,848 B1
(45) Date of Patent: Jun. 5, 2001

(54) METHOD FOR PROCESSING RECYCLED WASTE PAPER FOR INTEGRATED PACKAGING

(75) Inventor: Roger Hoffman, Greenbay, WI (US)

(73) Assignee: The Hoffman Group, Ltd., Green Bay, WI (US)

( * ) Notice: Subject to any disclaimer, the term of this patent is extended or adjusted under 35 U.S.C. 154(b) by 0 days.

(21) Appl. No.: 09/336,982

(22) Filed: Jun. 21, 1999

(51) Int. Cl.[7] ............................... D21H 11/14; D21B 1/08
(52) U.S. Cl. ................................ 162/4; 162/189; 162/191; 162/264
(58) Field of Search .......................... 162/4, 189, 190, 162/191, 264; 156/231; 270/52.5

(56) References Cited

U.S. PATENT DOCUMENTS

| | | | |
|---|---|---|---|
| 4,464,224 | * | 8/1984 | Matolcsy ............................... 162/111 |
| 4,906,334 | * | 3/1990 | Evens ................................... 162/264 |
| 5,520,803 | * | 5/1996 | Russell et al. ....................... 210/182 |
| 5,785,814 | * | 7/1998 | Tang et al. ........................... 162/191 |

* cited by examiner

Primary Examiner—Dean T. Nguyen
(74) Attorney, Agent, or Firm—Weiss & Weiss PC; Philip M. Weiss

(57) ABSTRACT

A single plant for making corrugated sheets out of recycled paper and a method for making the same. The plant includes a recycling pulper a board machine and a corrugator.

6 Claims, 1 Drawing Sheet

METHOD FOR PROCESSING RECYCLED WASTE PAPER FOR INTEGRATED PACKAGING

BACKGROUND OF THE INVENTION

The physical components of a finished corrugated container or box consist of two types of paperboard, which together are called containerboard. The two types of containerboard are linerboard and corrugated medium. Both types of containerboard are manufactured at paperboard mills out of either recycled pulp or virgin pulp. Because of an increased desire to include recycled pulp in a finished product many manufacturers of virgin pulp containerboards include a portion of recycled pulp in the furnish. Typically, linerboard and corrugated medium are made at different facilities, however, it is also common for linerboard and corrugated medium to be made at the same facility on different machines.

Because of differing desired specifications for pulp furnish for linerboard and corrugated medium, they are not made from the same pulping process. The differences are more striking in this regard with virgin pulp processes, where pulp for linerboard is made from a sulfate process and pulp from corrugated medium is made from a Neutral Sulfite green liquor or carbonate Semi-Chemical Process. These differences greatly contributed to the reason that the majority of manufacturing of linerboard and corrugated medium are done in separate facilities. With an increasing emphasis on recycling, the majority of new linerboard and corrugated medium production facilities are made with 100 percent recycled pulping processes.

Due to economics of scale considerations, as the industry grew, so did the size of its paper machines. For example, larger machines meant, among other things, lower labor costs. Board machines since the 1960's have been in the 300+ inch web width at speeds in excess of 3,000 feet per minute, with machines producing over 2,000 tons per day. These mills were built near forest resources, primarily in the southeast.

Due to a push for recycling content to be in all paper and board products, mills began to recycle by repulping Old Corrugated Containers (OCC). This OCC pulp typically is 20% to 40% of the total furnish, with existing virgin kraft pulp as the balance. This shift in production, changed the transportation logistics of the process. More specifically, OCC had to travel from the urban end user area back to the mills at the forest who in turn would ship the finished product back to the urban end user. In other words, the recycled fiber content on average made a 1,500 mile round trip. The prior art process incurs a tremendous freight charge.

Another transportation problem associated with the prior art mills is that the normal or natural market for sales from a corrugated plant is best described as being within a radius of 100 to 200 miles. The reason for this relatively small radius is that corrugated products are very bulky to transport and the price of the products is very low. This means that transportation as a percentage of the sales, price is very high. Compounding this is that containerboard is typically supplied to converting plants from locations that probably average 750 miles from the corrugated box plant by rail or by truck. This is outside of the normal or natural market and therefore affords no backhaul potential to defray the high outbound transportation from a corrugated box plant.

Scrap packaging is generated by nearly 100% of the companies that use corrugated containers. For example, nearly every manufacturer buys materials in corrugated containers and in turn ships it's outbound products in corrugated containers. Unfortunately, the amount of scrap generated at a typical location is inadequate to warrant the investment in a heavy duty baler that could impact sufficient density to the scrap material to allow it to be economically shipped hundreds of miles back to the containerboard mill for recycling. Similarly, retail outlets must either have high density balers or must collect lighter material which is sold to packers that prepare high density bales to ship to paper mills.

Virgin board mills are faced with increasing environmental compliance costs due to changing standards applied to the environmentally complex pulping system. Recycled mills, on the other hand, have been moving toward improved processes that minimize and even eliminate effluent discharge and have relatively minimum particulate and odor air emissions compared to their virgin mill conterparts. This allowed for these mills to be placed in urban settings.

Since these urban mills could be targeted for a smaller market (the urban area in which they serve) and automation has reduced labor needs for the process, these mills have been able to over come the economy of scale considerations and be competitive with the large virgin mills. The mills have been called mini-mills. Typically they are in the range of 400–700 tons per day with machines in the 160 to 250 inch web width range, operating at speeds that are less than ½ that of the fastest machines. These narrow widths and slower speeds have reduced the complexity of the machines, and therefore, the cost.

Despite these changes the mini-mills operate in the same fashion as the virgin mills they grew out of. The mills produce board as an intermediate product, to be shipped to corrugators, who use the rolls, to manufacure corrugated sheets. These sheets in turn are either made into boxes at the plant (this essentially involves printing, die cutting, folding and gluing) or are sold to sheet plants that convert the sheets to finished boxes for customers. These corrugators and box makers can either be part of the same company as the board manufacturer or are outside customers of the mill.

While this product flow and the necessary manufacturing steps to accomplish this flow had made sense for the virgin board manufacturer in the past, it involves many wasteful and unneeded steps associated with the recycled board manufacturing industry. Yet, due to the legacy of virgin board manufacturing, all mini-mills continue to pursue the product flow and all the unnecessary steps.

Since prior art board machines are much larger than even the largest corrugator, all parent rolls coming off the board machine must be slit and rewound on a rewinder. This adds to capital cost. A rewinder costs over $1,000,000. There is also a significant labor cost (up to 5% of the labor for board manufacture) in the rewinding process.

In the prior art there is a considerable wastage of trim (i.e., clippings and other wastage problems). Further, in the prior art, the width of the board machines is not matched to industry corrugators. Plus, prior art mills serve numerous clients with different width requirements due to differing corrugator widths. This results in trim rolls that sit on a warehouse floor for long periods of time. These trim rolls are sold most of the time at prices well below the mill's costs. Accordingly, waste of unusable trim is an economic problem.

Another economic factor involving trim is that in the prior art it must be shipped back to the mills to be recycled. Mills ship board to corrugator and box makers. Waste (trim, i.e., clippings and other wastage) from corrugator and box making must in turn be shipped back to the mill for recycling.

The present invention comprises Integrated Packaging, which is directed to an improved system and process of manufacturing corrugated sheets, corrugated containers and other paper board products. The benefit of Integrated Packaging is: lower project capital costs, lower manufacturing costs, lower overhead costs, which results in greater opportunities for manufacturing in urban areas, lower packaging costs, less damaging environmental practices through fewer processing steps and lower transportation needs of producing the ultimate final product (which yields lower transportation vehicle emissions).

SUMMARY OF THE INVENTION

Generally, the present invention comprises a method for processing recycled waste paper to make corrugated sheets, corrugated boards and other paper board products and the plant used in such method. The present invention comprises a method of for processing recycled waste paper in a single plant. The plant includes a recycling pulper, a board machine, and a corrugator. The plant may also include a corrugated container converting stage. The method for forming corrugated sheets comprises forming a pulp by processing recycled paper in a recycling pulper. The pulp is then placed on a board machine. The board machine is operated to produce a substrate of linerboard and a substrate of corrugated medium from the pulp. The substrates are then wound onto a roll. The substrates are placed onto a corrugator. The corrugator produces a corrugated sheet. If it is desired to produce a container the corrugated sheet can then be run through a corrugated container converting stage to produce the container.

A further object of Integrated packaging involves having a board machine the same or substantially the same width as the onsite corrugator. Another object of the present invention is to have the width of the board machine be a multiple of the width of the corrugator, and provide a slitter, preferably on the board machine, that would produce substrates that would be of an equal width of the corrugator. Therefore there would be little or no trim roll wastage of linerboard or corrugated medium. It is an object of the present invention, to have an on-site corrugated facility that produces corrugated sheets that are either bound and shipped to sheet plants and/or preferably finished into boxes at an on-site box plant (old boxes in, new boxes out is best logistically) to primarily serve the local market place. An on-site location for the corrugator and box plant is a preferable method.

To increase the production of this machine to reach commercially practical speeds, some linerboard or medium could be sold to the open market or more consistent to integrated packaging, some other converting could utilize the excess board machine production. At 110 inches the board machine at fast speeds may be in the 400 ton per day to 500 ton per day range, which is still considerably below the mini-mill, thus leading to excess capacity.

With the smaller size machine of the present invention, certain new processes can be incorporated that not only overcome potentially higher per-unit capital costs and labor associated with the intermediate product, but actually significantly decrease the overall cost structure of the ultimate finished product of corrugated sheets and corrugated containers. These include:

Lower administrative costs, fewer administrative personnel, less office personnel, management and sales, and other fixed costs associated with having only one business unit. There is also a reduction of duplicative elements having only one manufacturing facility: (If there is only one site there is less equipment, and only one parking lot, for example).

It is an object of the present invention to eliminate rewinding. Accordingly, the labor used to otherwise run the rewinder can fully staff the corrugator. Further, without a rewinder, there is no need for costly steel machine spools for parent rolls. It is a further object of the present invention to provide a machine design that is unique in that it has a reel which accepts reusable and/or recyclable fiber cores, preferably cores having a large diameter, e.g., approximately 12 inches.

It is an object of the present invention to solve trim problems. This provides a significant benefit. The present invention provides a plant having both a board machine and a corrugator. Corrugator waste can go right back to machine prep, not back through an entire pulping process. If the corrugator is not on site, the corrugator waste must go back through the whole pulping process. In a further embodiment, waste or trim from the corrugated container converting stage can be conveyed back to the recycled pulper.

It is a further object of the present invention to recycle small, low density mini-bales or even loose material as a backhaul to box delivery rather than contract a broker/packer. For this reason, the recycling system of the present invention is designed with an in-feed system that can accommodate bulkier waste. In a preferred embodiment the in-feed system can include wider conveyors, open space for loose storage, and a conveyor system for transporting loose material from the conveyor to the pulper. In fact, the loose waste can be pushed by a caterpillar or similar machine to where it can be recycled. Conversely, the loose material can be baled for storage at the site. In a further embodiment, self unloading "walking floor" trailers may be employed.

There is a large cost savings associated with the Integrated packaging of the present invention in that trim from converting operations is conveyed back into pulping operations, rather than expensive collection, brokering, and transporting of trim.

Shipping, preparation, handling and delivery are all associated with cost savings by the present invention. Manufacturing board as an intermediate product results in dual handling costs that involve additional labor and waste.

The machine and pulp process of the present invention are accommodating to make both linerboard and corrugated medium, as a corrugator requires both products. The present invention further provides an efficient inventory process for intermediate storage between the board machine and the corrugator.

DETAILED DESCRIPTION OF THE DRAWINGS

Figure 1:
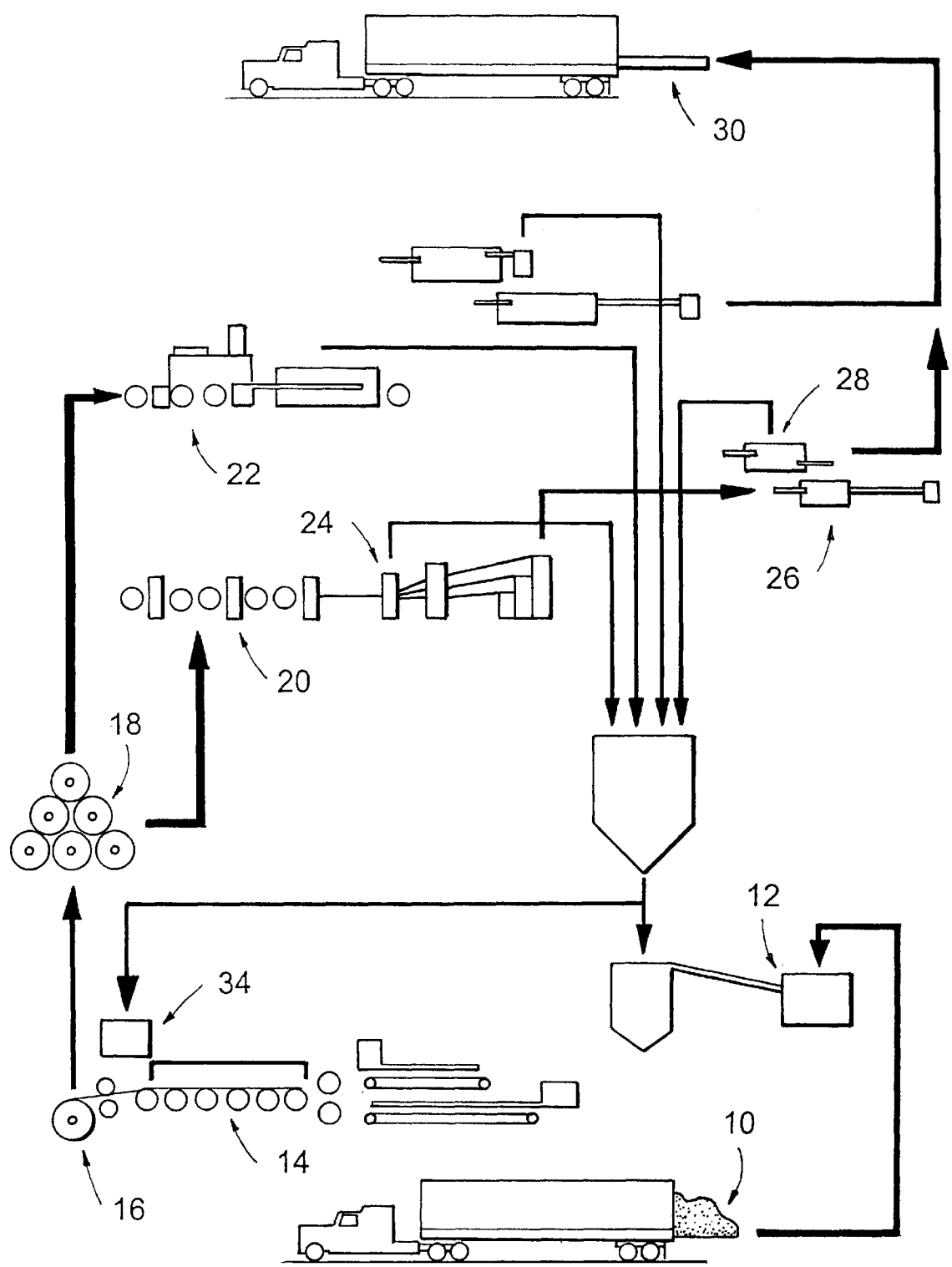
FIG. 1 illustrates a system and method for making corrugated sheets, corrugated boards and other paper board products.

FIG. 1 shows a system and method for making corrugated sheets, corrugated packaging or other paper board products out of recycled paper. Old Packaging or OCC 10 and Waste paper 10 are brought to the mill. The waste paper 10 is brought to the recycling section of the mill where it is placed into a recycling pulper 12 and through the recycling process which turns the OCC and wastepaper 10 into fiber or pulp. The fiber or pulp is then placed onto board machine 14. The board machine 14 produces substrates of linerboard and corrugated medium from the pulp. The board machine 14 has no associated rewinder. At the end of the board machine 14 is a reel 16 where the substrate for the packaging is wound. In a preferred embodiment the reel 16 accepts reusable and/or recyclable fiber cores.

In a preferred embodiment the width of the corrugator 20 substantially matches the width of the board machine 14. In a further embodiment, the width of the board machine 14 is a multiple of the width of corrugator 20. In this embodiment, a slitter, preferably on the board machine 14, is used to cut the substrate produced to fit the size of the corrugator 20 without any waste. For example if the board machine 14 had a width of 220" then the corrugator 20 would have a width of 110", and the slitter would divide the substrate that comes out of the board machine 14 into two 110" substrates. The wound rolls may then be stored as shown in the mill at 18 before they enter the corrugator 20 or another converting machine 22. The board machine 14 will have a cycle of making corrugated medium substrate and then linerboard substrate. The resulting corrugated medium and linerboard can be stored at 18 before being used on the corrugator 20.

In a preferred embodiment, the trim 24 from corrugator 20 can be forwarded to the dry end pulper 34 located at the end of the board machine 14. This trim 24 has no printing or ink on it and therefore can go right to the dry end pulper 34. However, once the packaging has entered the corrugated container converting 26, any trim with printing 28 collected must return to the recycling pulper 12, because at this point the trim 28 has ink and printing on it. In the same mill other converting of packaging products can occur. Once the products have left the Corrugated Container converting stage 26, they are ready to be shipped out as new packaging 30.

In a single plant are recycling pulper 12, a board machine 14 and a corrugator 20. In a preferred embodiment the single plant also includes a corrugated container converting stage 26. Rewinders are not used in the plants of the present invention.

What is claimed is:

1. A method of making a corrugated sheet from recycled paper in a single plant including a recycling pulper, a board machine, and a corrugator, the method consisting essentially of the steps of:

forming a pulp by processing recycled paper in the recycling pulper;

placing said pulp on the board machine;

operating said board machine to produce substrates of linerboard and corrugated medium from said pulp;

winding said substrates onto a reel to form a roll;

placing said roll onto the corrugator;

operating said corrugator to produce a corrugated sheet.

2. The method of claim 1 wherein said corrugated sheet is placed into a corrugated container converting stage to produce packaging.

3. The method of claim 2, wherein trim from said corrugated container converting stage is placed into said recycling pulper.

4. The method of claim 2 wherein an in-feed system transports loose material to said recycling pulper.

5. The method of claim 1, wherein trim from said corrugator is placed into a dry end pulper at an end of said board machine.

6. The method of claim 1 wherein said substrate is cut to fit said corrugator.

* * * * *